United States Patent
Barczynski et al.

(10) Patent No.: US 6,932,417 B2
(45) Date of Patent: Aug. 23, 2005

(54) VEHICLE SLIDING DOOR WITH EXTENDED TRAVEL

(75) Inventors: Darek Barczynski, Farmington Hills, MI (US); Tsuguo Hoshikawa, West Bloomfield, MI (US); Aleksandar Hrnjak, Ontario (CA)

(73) Assignee: Gecom Corporation, Greensburg, IN (US)

( * ) Notice: Subject to any disclaimer, the term of this patent is extended or adjusted under 35 U.S.C. 154(b) by 0 days.

(21) Appl. No.: 10/941,571

(22) Filed: Sep. 15, 2004

(65) Prior Publication Data

US 2005/0062313 A1 Mar. 24, 2005

Related U.S. Application Data

(60) Provisional application No. 60/505,018, filed on Sep. 23, 2003.

(51) Int. Cl.[7] .................................................. B60J 5/06
(52) U.S. Cl. ............................ 296/155; 49/213; 49/216; 49/360
(58) Field of Search ........................... 296/155; 49/213, 49/214, 215, 216, 360

(56) References Cited

U.S. PATENT DOCUMENTS

| | | | | | |
|---|---|---|---|---|---|
| 4,495,729 A | * | 1/1985 | Britzke et al. | ................. | 49/212 |
| 6,036,257 A | * | 3/2000 | Manuel | ...................... | 296/155 |
| 6,328,374 B1 | * | 12/2001 | Patel | ........................... | 296/155 |

* cited by examiner

*Primary Examiner*—Joseph D. Pape
(74) *Attorney, Agent, or Firm*—Barnes & Thornburg LLP

(57) ABSTRACT

A track system for extended rearward movement of a vehicle door is provided. The track system has an upper track coupled to the vehicle above the opening that the door closes. An upper roller assembly moves within the upper track and is connected by an upper extension assembly to the door. The upper extension assembly has an outer extension member coupled to the door and an inner extension member coupled to the roller assembly. The outer and inner extension members move relative to one another to allow the door to open more fully. Lower and/or middle tracks, and corresponding roller assemblies and extension assemblies may also be provided.

20 Claims, 7 Drawing Sheets

VEHICLE SLIDING DOOR WITH EXTENDED TRAVEL

This application claims the benefit of and priority to U.S. Provisional Patent Application No. 60/505,018, filed Sep. 23, 2003, the disclosure of which is now incorporated herein by reference.

FIELD OF THE INVENTION

The present invention relates to vehicle sliding doors, and more particularly to a track system for mounting a side door on a van-type vehicle.

BACKGROUND OF THE INVENTION

Sliding doors are used on vans and mini-vans to provide access to the vehicle for passengers in second or third row seats. Due to the vehicle's geometry and kinematics of door movement, when the sliding door is fully open, there is still a significant portion of the door opening covered by the sliding door itself. Typically, sliding door track mechanisms on vans comprise an upper track which is attached to the upper portion of the vehicle body (close to the roof) to provide direction for sliding door movement. This upper track typically extends along and above the opening. An upper roller assembly is attached to the top of the sliding door and moves along the upper track. A middle track is provided which is attached to the middle portion of the vehicle (the van body) and extends from the rear edge of the opening rearwardly on the side of the van. This middle track provides direction for sliding door movement of the door. A middle roller assembly is attached to the middle rear portion of the sliding door and moves along the middle track. Then, a lower track is typically provided which is attached to the lower portion of the vehicle body to extend along and below the door opening. This lower track also gives direction to the sliding door movement. A lower roller assembly is attached to the lower portion of the sliding door and moves along the lower track.

Typically, a latching system is provided which is attached to the sliding door and keeps the door closed by engagement to a striker or strikers which are attached to the vehicle body. Inside and outside handles attached to the sliding door and connected to the latching system by rod or cable are provided. The purpose of the handles is to release a latch or latches to open the sliding door.

This typical and well known current sliding door operation is such that, when the door is in its normal open position, a significant portion of the door opening is covered by the sliding door itself. If this door can be moved from its normal open position partially blocking the opening to a further or extended position, ingress and egress through the opening would be made more comfortable.

SUMMARY OF THE INVENTION

The present invention comprises one or more of the features outlined in the attached claims or in the following paragraphs or combinations thereof. A track system is provided for accommodating movement of a vehicle door from its fully closed position closing an opening into the vehicle to a normal open position typically defined by the upper or lower tracks and then to an extended or rearward position provided by extension assemblies.

Illustratively, a track system for supporting a vehicle door for extended rearward movement relative to an opening in the side of the vehicle such as a van or a mini-van is provided. The vehicle has an upper track extending along and above the opening, a lower track extending along and below the opening, and a middle track disposed vertically between the upper and lower tracks to extend from the rear edge of the opening toward the rear of the vehicle. The track system illustratively comprises upper and lower roller assemblies movable respectively along the upper and lower tracks. The roller assembly movement along the tracks may be rolling or sliding or combinations thereof. Then, upper and lower extension assemblies are configured respectively to couple the upper and lower roller assemblies to the door. Each of the extension assemblies has an outer extension member to be coupled to the door and an inner extension member to be coupled to its respective roller assembly. The outer and inner extension members extend in the direction of the tracks and are coupled together for extension and retraction movement in the direction of their extension. Illustratively, these extension assemblies serve as slide mechanisms or slide assemblies having outer and inner members with the outer members attached to the door and the inner members attached to the respective roller assemblies. When a roller assembly moves to the rearward end of its track on the vehicle, the door will stop in its normal open position. When the door is moved farther rearwardly, this additional movement is accomplished by the relative extension movement of the extension members, i.e., the door moves relative to the attached roller assemblies.

In some embodiments, the middle track extending from the rear edge portion of the vehicle opening may be elongated to extend a greater distance toward the rear of the vehicle to accommodate the extended movement provided by the extension assemblies coupling the upper and lower roller assemblies to the door. In other embodiments, an extension assembly may be used to couple the middle roller assembly to the door to accommodate the further movement of the door rearwardly.

The extension assembly for each track may provide a motion resistance to retraction movement less than the motion resistance provided by its track and roller assembly. Thus, when the door is moved from its full open position toward its fully closed position, the extension assembly will retract to move the door to its normal open position. A latch may be configured to release the extension assembly for extension and retraction. The latch may be configured automatically to lock the extension assembly against extension and retraction when the door is moved from the full open position to its normal open position. This latch, which may be optional as will be discussed may be configured to be manually opened to permit extension movement of the extension assembly associated with each track when the door is in its normal open position to permit movement of the door to its full open position.

The extension assemblies may be used with manual opening of the door or with power opening of the door. A regular power drive sliding door unit may be used to move the door in accordance with the present invention. One aspect of the present invention is to provide extended door travel when required by manual operation, regardless of whether the vehicle is or is not equipped with a power drive system for the door.

It will be appreciated that the illustrative track system is ideally suited for use with vans or mini-vans to provide for extended movement or additional movement of sliding doors at one or both sides of the van from their normally closed position or fully closed position to their normal open positions and through the normal open positions to extended or full open positions providing more opening through which to move passengers in and out of the van. In these vans, such openings have a forward opening edge or edge portion toward the front of the vehicle and a rear edge or edge portion toward the rear of the vehicle. Similarly, the doors have upper portions, lower portions, forward portions and rear portions. The term "outer" in this specification and claims is intended to refer to the direction laterally out of the vehicle and the term "inner" is intended to refer to the direction laterally into the vehicle. Thus, an "outer member" is attached to the door and the "inner member" is attached to the roller assembly which, in turn, moves in the track on the vehicle.

DETAILED DESCRIPTION OF THE DRAWINGS

Figure 1:
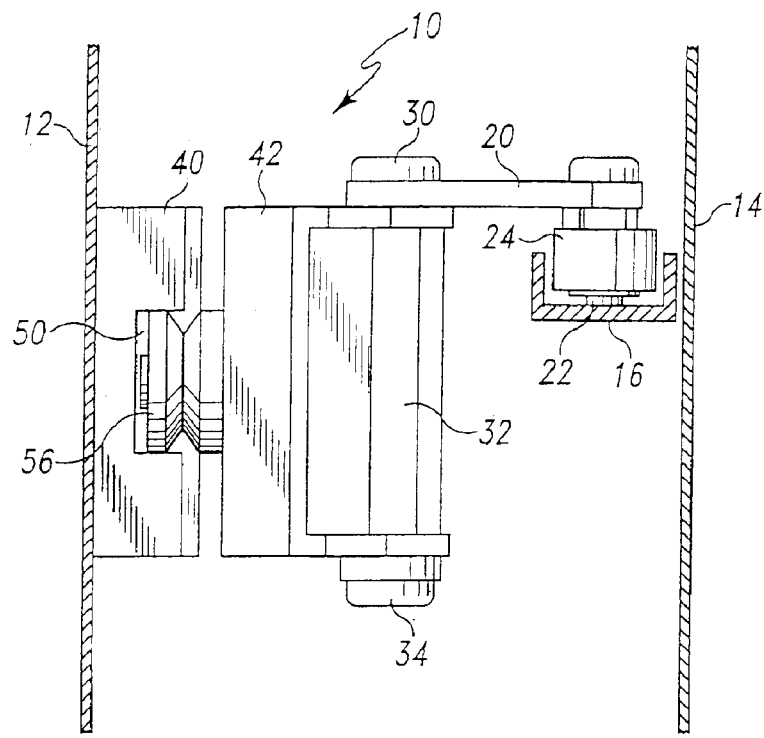
FIG. 1 is a sectional view showing somewhat diagrammatically an extension assembly or slide arrangement for attaching a door to a roller assembly which moves along a track extending along a vehicle.
Figure 2:
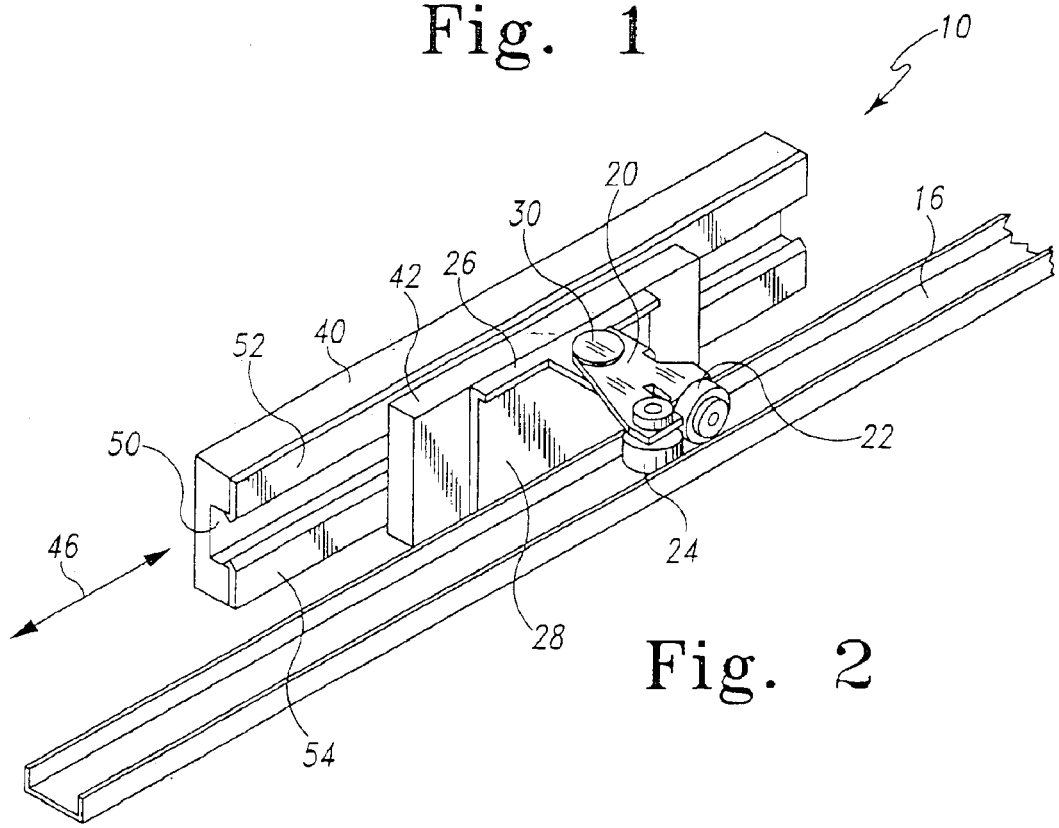
FIG. 2 is a somewhat diagrammatic and isometric view of the structure shown in FIG. 1.

FIGS. 1 and 2 show somewhat diagrammatically, an extension assembly or slide assembly 10 of the type which may be used in accordance with the present invention to couple a door to a roller assembly which, in turn, moves along a track coupled to a vehicle. Diagrammatically and illustratively, a track 16 is shown which may be welded or otherwise attached or formed on a vehicle to extend along and above the opening or along and below the opening. A functionally similar track may be provided as the middle track as discussed hereinafter. A roller assembly which illustratively comprises a plate or bracket 20 extending inwardly to support a roller 22 which runs on the bottom of the track 16 because the roller rotates about a horizontal axis. The plate 20 also carries a roller 24 which is journaled about a vertical axis so that it engages the side walls of the track 16 for guiding movement of the door 12 relative to the vehicle 14. Thus, there is movement of the roller assembly along the track 16, and that movement may be a rolling, sliding or guiding movement. The plate 20 is illustratively attached to a flange 26 of a support plate 28 by a fastening element shown as having head 30, shaft 32 and fastener 34 in FIG. 1. It will be appreciated that, in illustrative embodiments, the roller assembly which moves along the track 16 may be attached to the extension assembly using a variety of approaches well known in the mechanical field. Adjustments may be provided for moving parts relative to each other to provide alignment and adjustment of the door 12 relative to the vehicle 14.

The extension assembly 10 comprises an outer member 40 and an inner member 42 which extend in the direction of the track 16. These members 40, 42 are coupled together for extension and retraction movement in the direction of the arrow 46 which is parallel to the direction of the track 16. Illustratively, the outer member 40 provides a track 50 defined by upper and lower plates 52, 54 attached to the member 40 to extend there along to capture in the track a roller 56 which is journaled on the member 42. It will be appreciated that one or more such rollers 56 may be provided on the inner member 42 to accommodate the relatively easy extension and retraction of the members 40, 42. It will also be appreciated that the door 12 and the member 40 attached to the door can move relative to the member 42 which is attached to the plate 20 of the roller assembly which engages the track 16. Thus, when the roller assembly comprising the plate 20 and rollers 22, 24 move on the track 16 to some point on the track which provides a stop or hindrance to that movement, the outer member 40 of the extension assembly 10 can then move further in the direction of arrow 46 to move the door 12 relative to the track as seen for example in FIGS. 4, 6 and 8.

Figure 3:
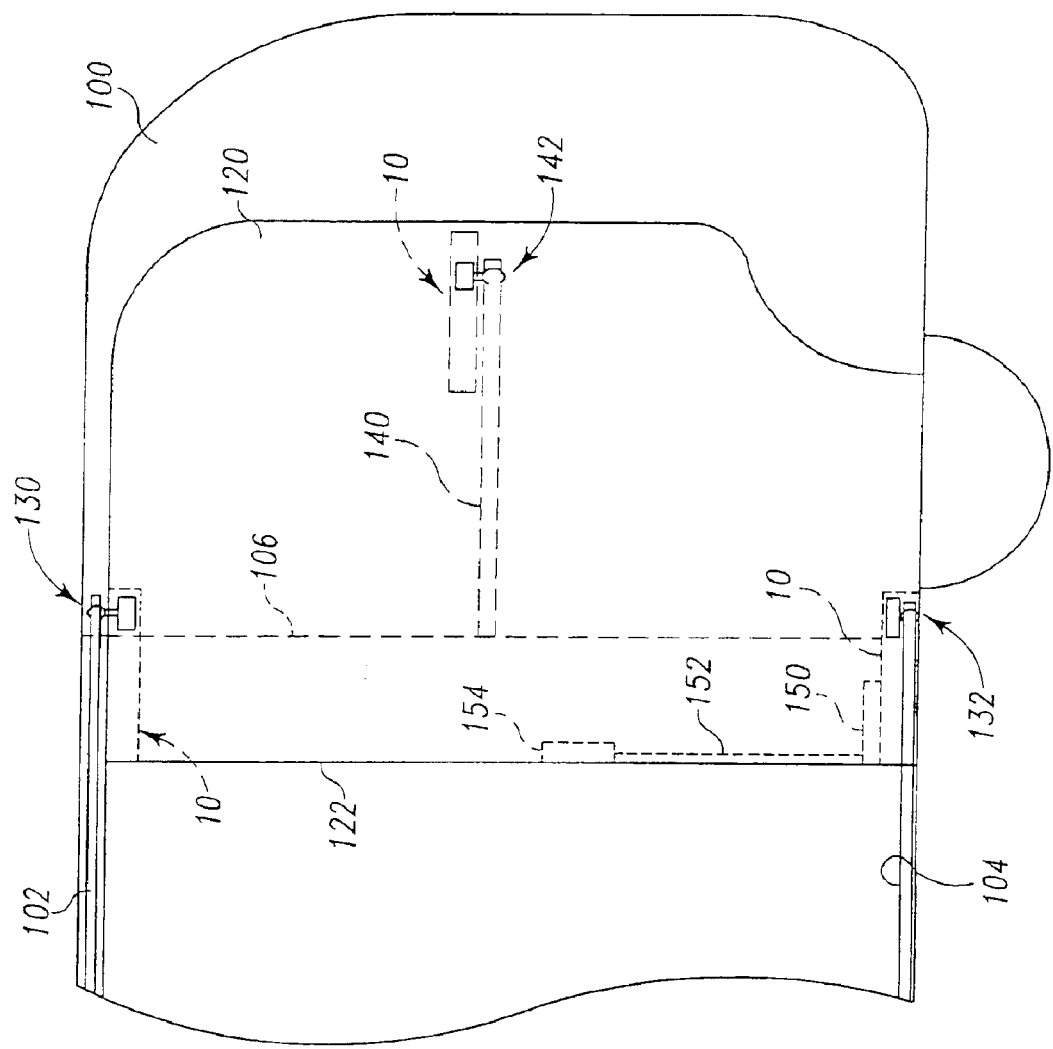
FIG. 3 is a fragmentary and diagrammatic view showing a van door moved to its normal open position.
Figure 4:
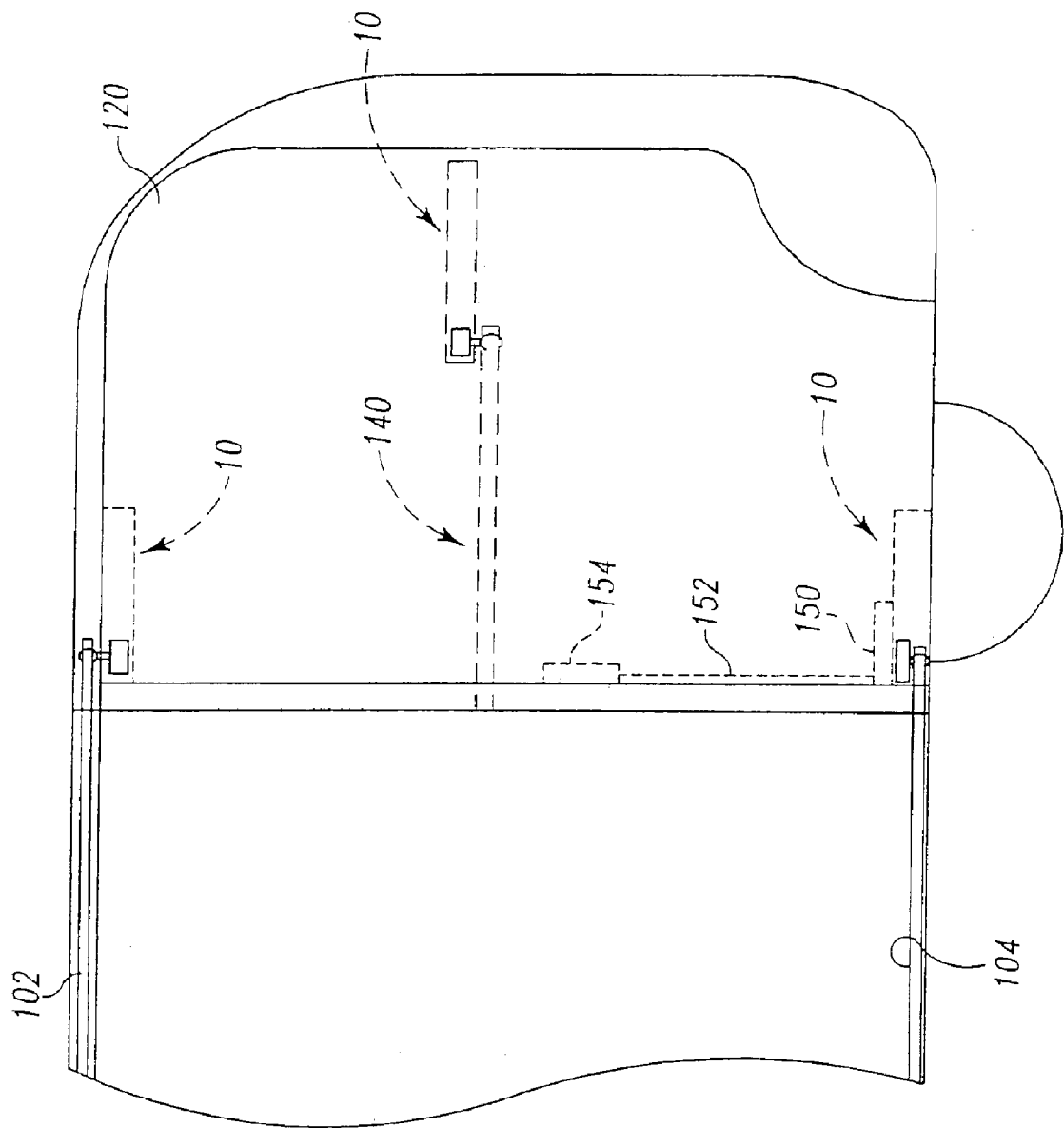
FIG. 4 is a view similar to FIG. 3, but showing the door moved to its fully extended position providing full access to the opening.

FIGS. 3 and 4 show one illustrative embodiment of the present invention comprising a van or vehicle 100 having an upper track 102 extending along and above the opening in the side of the van and a lower track 104 extending along and below the opening in the side of the van. The rear edge of the opening is shown by the dash line 106. In FIG. 3, the door 120 is shown in its normal open position with its forward edge 122 forward of the rear edge 106 of the opening. An upper roller assembly is shown diagrammatically and indicated by the reference numeral 130 and a lower roller assembly is shown diagrammatically and indicated by reference numeral 132. These roller assemblies 130, 132 support the door 120 for movement in the upper track 102 and lower track 104, respectively. A middle track is indicated by dash lines 140 and a middle roller assembly 142 is indicated diagrammatically to support the middle rear portion of the door 120 on the middle track 140. The roller assemblies 130, 132 and 142 may be configured as shown in FIGS. 1 and 2 or in some other suitable structure.

Then, an extension assembly 10 is provided to couple each of the roller assemblies 130, 132, 142 to the door as discussed in connection with FIGS. 1 and 2. In addition, a latch 150 is connected by a cable or an actuator rod 152 to a handle 154 with the latch, the actuator rod or cable and handle 154 being shown in dash lines.

With the door 120 in the position shown in FIG. 3, i.e., partially obscuring the opening or being forward of the rear edge 106 of the opening, the latch 150 can be operated by the handle 154 to release the extension assembly 10 associated with the lower track 104 so that each of the extension assemblies 10 can have relative extension to move the door 120 from its FIG. 3 normal open position to its FIG. 4 full open position. Essentially, in the FIG. 4 position of the door 120, the extension assembly 10 for each track 102, 104, 140 is fully extended such that the door 120 has moved relative to the roller assembly coupled to the extension assembly. When the door is in its full open position shown in its FIG. 4, it can be manually pushed forwardly to its FIG. 3 position because the motion resistance of each extension assembly 10 is designed to have less resistance to movement than the resistance to movement of the attached roller assembly in the associated track. Thus, when the door is pushed forwardly from the FIG. 4 position, the extension assemblies 10 will retract until the door arrives at its normal open position shown in FIG. 3. Illustratively, the latch 150 may automatically engage at that point to lock the extension assemblies 10 against further extension and retraction so that further movement of the door 120 toward the front of the vehicle will move the roller assemblies 130, 132, 142 along their respective tracks 102, 104, 140. In that fashion, the door 120 is moved to its fully closed position. The movement of the door 120 from its fully closed position to its normal open position shown in FIG. 3 may be accomplished manually or by power drive motor in conventional fashion. The further movement of the door 120 from its FIG. 3 position to its FIG. 4 position may be accomplished by disengaging the latch 150 and manually pushing or powering as by a motor the door to its FIG. 4 position, i.e., its full open position.

Figure 5:
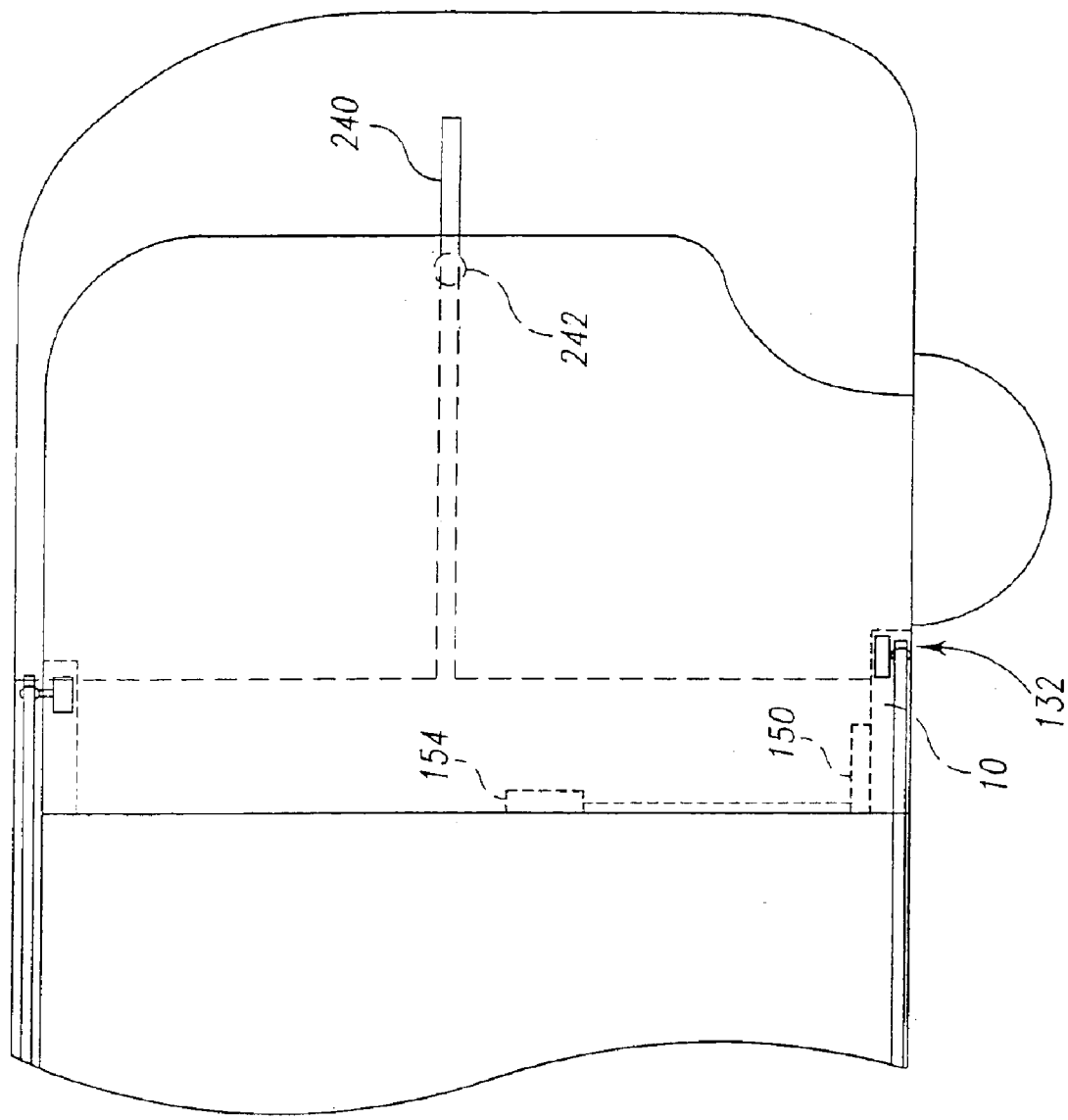
FIG. 5 is a diagrammatic view showing another embodiment of the present invention, particularly an extended middle track.
Figure 6:
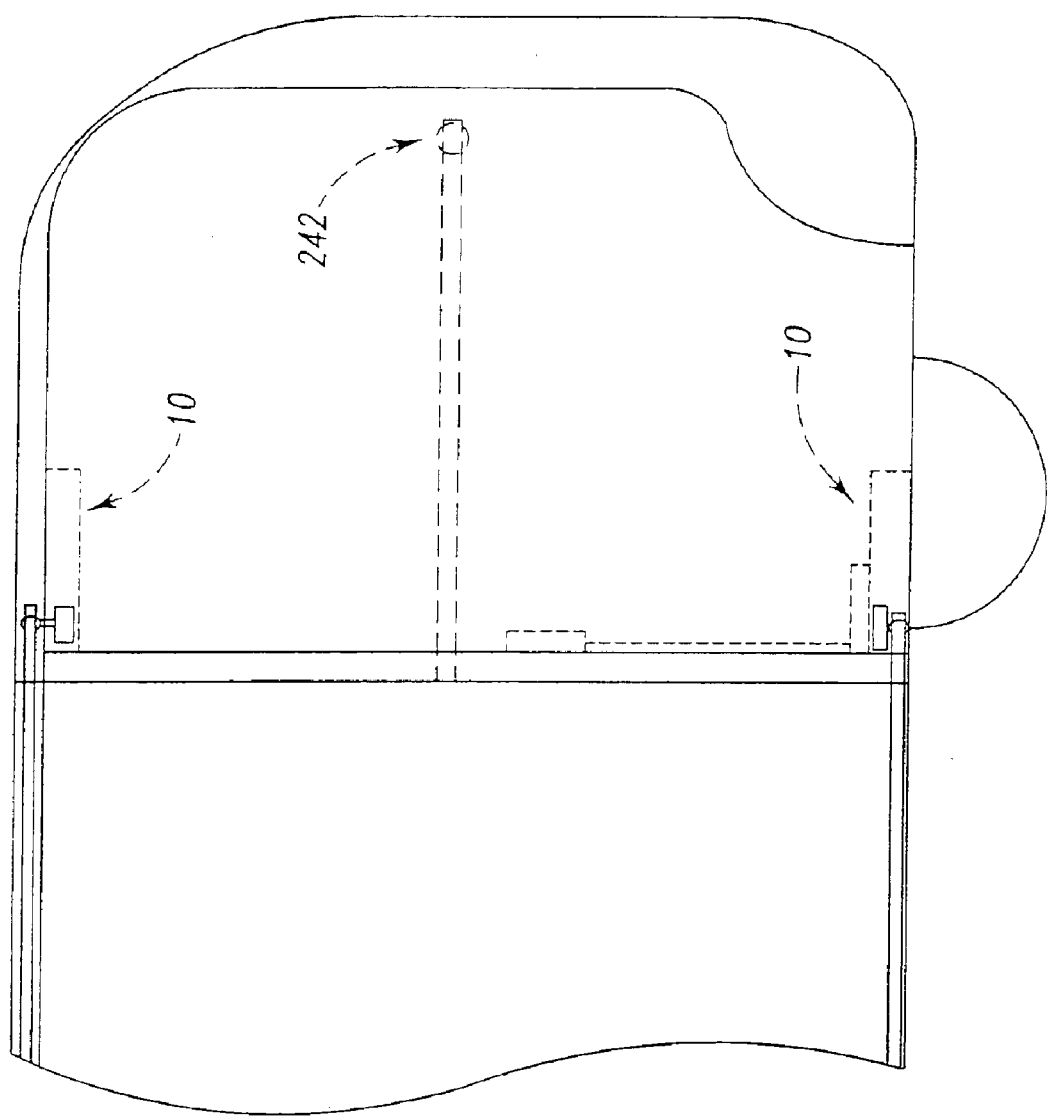
FIG. 6 is a similar diagrammatic view showing the van door in its full open position.

The embodiment suggested in FIGS. 3 and 4 has an extension assembly 10 associated with each of the tracks 102, 104, 140. The embodiment shown in FIGS. 5 and 6 is similar except that the middle track 240 is extended to a greater extent toward the rear of the van so that the middle roller assembly 242 may move to the full extent of the middle track as shown in FIG. 6. In the embodiment shown in FIGS. 5 and 6, the extension assemblies 10 associated with the upper and lower tracks 102, 104 function in the same or similar manner to the way they function in the FIGS. 3 and 4 embodiment. However, in FIGS. 5 and 6, there is no middle extension assembly.

Figure 7:
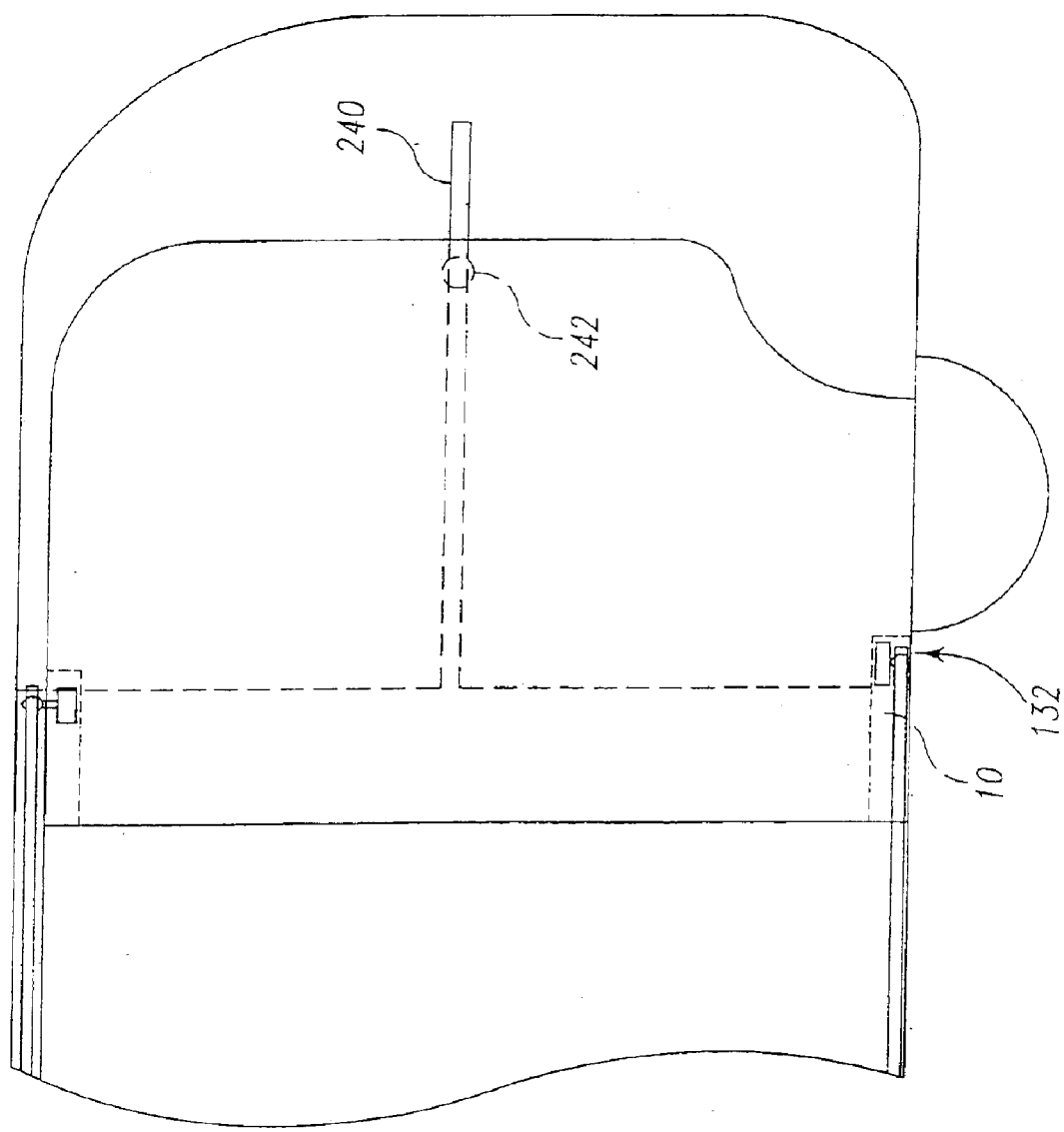
FIGS. 7 and 8 are diagrammatic views showing the track system without a latch mechanism.
Figure 8:
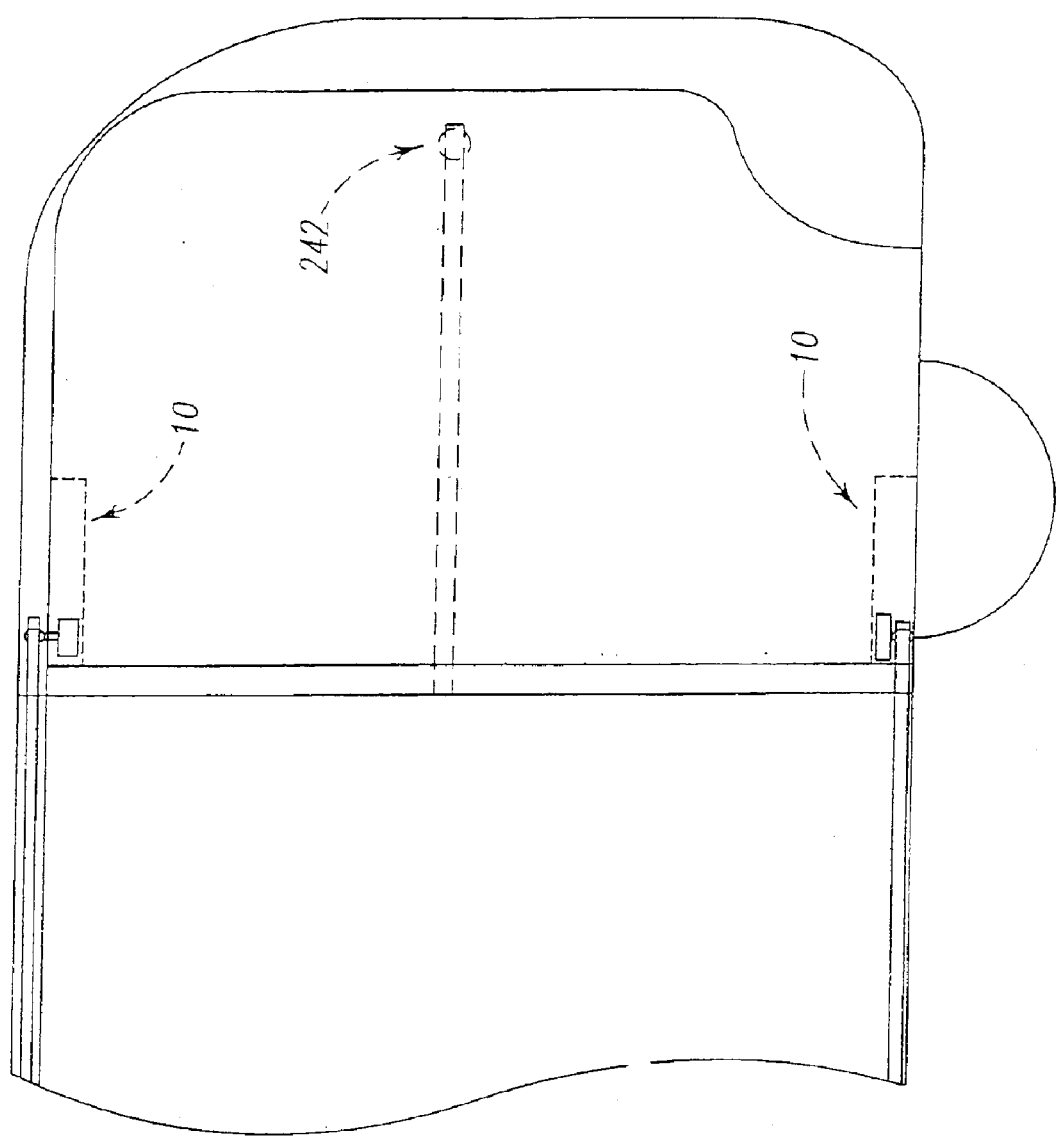

The embodiment of FIGS. 7 and 8 suggests that the latch mechanism depicted illustratively in FIGS. 3–6 may be removed from the assembly.

It will be appreciated that a variety of types of latches indicated at 150 may be provided for use with either the extension assembly 10 of the lower track 104 as indicated in FIGS. 3–6, or, for that matter, for the extension assembly 10 associated with the upper track 102. In other words, a latch assembly operated by handles such as indicated at 154 may release either or both the extension assemblies 10 associated with the upper track 102 and lower track 104. The latch 150 may be provided in a variety of forms to lock the extension assembly 10 against extension and retraction or to release the extension assembly 10 for extension or retraction. A latch may also be provided for holding the door 120 in its most extended or full open position by locking the extension assembly outer member 40 and inner member 42 against relative movement. While the latch may automatically engage to stop relative extension and retraction of the extension assembly, the extension and retraction may be accomplished by providing stops to limit the movement of the outer member 40 relative to the inner member 42.

Further, it will be appreciated that, for some designs, as shown for example in FIGS. 7 and 8, it may not be required to have a latch such as indicated at 150 on either roller assembly or extension assembly associated with either the lower track 104 or upper track 102.

While the invention has been illustrated and described in detail in the drawings and foregoing description, the same is to be considered as illustrative and not restrictive in character, it being understood that one skilled in the art will recognize, and that it is desired to protect, all aspects, changes and modifications that come within the spirit of the invention.

What is claimed is:

1. For use with a vehicle opening having a sliding door movable from a fully closed position to permit ingress and egress, the door having an upper portion, a lower portion, a forward portion and a rear portion, a track system comprising:
   (a) an upper track to be non-movably coupled to the vehicle to extend longitudinally along and above the vehicle opening to be closed by the door,
   (b) an upper roller assembly to move in the upper track, and
   (c) an upper extension assembly to connect the upper roller assembly to the upper portion of the door,
   (d) the upper extension assembly having an upper outer member to be coupled to the door and to extend in the direction of the upper track and an upper inner member to be coupled to the upper roller assembly and to extend in the direction of the upper track, the upper inner member and upper outer member being coupled together for relative extension and retraction movement along the direction of extension of the upper members to provide for movement of the door relative to the opening from the fully closed position initially along the upper track to a normal open position and then by relative extension movement of the upper extension assembly to a full open position.

2. For use with a vehicle opening having a sliding door movable from a fully closed position to permit ingress and egress, the door having an upper portion, a lower portion, a forward portion and a rear portion, a track system comprising:
   (a) an upper track to be coupled to the vehicle to extend longitudinally along and above the vehicle opening to be closed by the door,
   (b) an upper roller assembly to move in the upper track, and
   (c) an upper extension assembly to connect the upper roller assembly to the upper portion of the door,
   (d) the upper extension assembly having an upper outer member to be coupled to the door and to extend in the direction of the upper track and an upper inner member to be coupled to the upper roller assembly and to extend in the direction of the upper track, the upper inner member and upper outer member being coupled together for relative extension and retraction movement along the direction of extension of the upper members to provide for movement of the door relative to the opening from the fully closed position initially along the upper track to a normal open position and then by relative extension movement of the upper extension assembly to a full open position, the upper extension assembly providing a motion resistance to the retraction movement less than the motion resistance provided by the upper track and the upper roller assembly such that, when the door is moved from its full open position toward its fully closed position the upper extension assembly will retract to move the door to its normal open position.

3. The track system of claim 1 comprising a latch configured to release the upper extension assembly for extension and retraction.

4. For use with a vehicle opening having a sliding door movable from a fully closed position permit ingress and egress, the door having an upper portion, a lower portion, a forward portion and a rear portion, a track system comprising:
   (a) an upper track to be coupled to the vehicle to extend longitudinally along and above the vehicle opening to be closed by the door,
   (b) an upper roller assembly to move in the upper track,
   (c) an upper extension assembly to connect the upper roller assembly to the upper portion of the door,
   (d) the upper extension assembly having an upper outer member to be coupled to the door and to extend in the direction of the upper track and an upper inner member to be coupled to the upper roller assembly and to extend in the direction of the upper track, the upper inner member and upper outer member being coupled together for relative extension and retraction movement along the direction of extension of the upper members to provide for movement of the door relative to the opening from the fully closed position initially along the upper track o a normal open position and then by relative extension movement of the upper extension assembly t a full open position, and a latch configured to release the upper extension assembly for extension and retraction the latch being configured to automatically lock the upper extension assembly against extension and retraction movement when the door is moved from it full open position to its normal open position.

5. The track system of claim 4 in which the latch is configured to be manually opened to permit extension movement of the extension assembly when the door is in its normal open position to permit movement of the door to its full open position.

6. The track system of claim 1 in which the upper extension assembly comprises a roller arrangement coupling the upper outer member and upper inner member together for the extension and retraction movement.

7. The track system of claim 1 in which the upper outer member provides a track, and at least one roller coupled to the upper inner member moves in the track of the upper outer member to provide the extension and retraction movement.

8. The track system of claim 1 comprising:
   (a) a lower track to be coupled to the vehicle to extend longitudinally along and below the vehicle opening to be closed by the door,
   (b) a lower roller assembly to move in the lower track, and
   (c) a lower extension assembly to connect the lower roller assembly to the lower portion of the door,
   (d) the lower extension assembly having a lower outer member to be coupled to the door and to extend in the direction of the lower track and a lower inner member to be coupled to the lower roller assembly and to extend in the direction of the lower track, the lower inner member and lower outer member being coupled together for relative extension and retraction movement along the direction of extension of the lower members to provide for movement of the door relative to the opening from the fully closed position initially along the lower track o a normal open position and then by relative extension movement of the lower extension assembly the full open position the lower track configured to support at least a portion of the weight of the door.

9. The track system of claim 8 in which the lower extension assembly provides a motion resistance to the retraction movement less than the motion resistance provided by the lower track and the lower roller assembly such that, when the door is moved from its full open position toward its fully closed position, the lower extension assembly will retract to move the door to its normal open position.

10. The track system of claim 9 comprising a latch configured to release the lower extension assembly for extension and retraction.

11. The track system of claim 10 in which the latch is configured automatically to lock the lower extension assembly against extension and retraction movement when the door is moved from its full open position to its normal open position.

12. The track system of claim 8 comprising:
   (a) a middle track coupled to the vehicle to be disposed between and extend in the direction of the upper and lower tracks,
   (b) a middle roller assembly to move along the middle track, and
   (c) a middle extension assembly to connect the middle roller assembly to the middle portion of the door, the middle extension assembly having a middle outer member to be coupled to the door and to extend in the direction of the middle track and a middle inner member to be coupled to the middle roller assembly to extend in the direction of the middle track, the middle inner member and middle outer member being coupled together for relative extension and retraction movement along the direction of extension of the middle members.

13. The track system of claim 8 comprising:
   (a) a middle track coupled to the vehicle to be disposed between and extend in the direction of the upper and lower tracks,
   (b) a middle roller assembly movable in the middle track, the middle roller assembly being coupled to the door adjacent its rear portion, and
   (c) the middle track extending rearwardly a distance sufficient to permit movement of the middle roller assembly and the door to the door's full open position.

14. A track system for supporting a vehicle door or extended rearward movement relative to an opening in the side of the vehicle, the door having an upper portion, a lower portion, a forward portion and a rear portion, the vehicle having an upper track extending along and above the opening, a lower track extending along and below the opening, and a middle track disposed between the upper and lower tracks and extending from the rear edge of the opening toward the rear of the vehicle, the track system comprising:
   (a) upper, lower and middle roller assemblies movable respectively along the upper, lower and middle tracks, and
   (b) upper, lower and middle extension assemblies configured respectively to couple the upper, lower and middle roller assemblies to the door, each of the extension assemblies having an outer extension member to be coupled to the door and an inner extension member to be connected to its respective roller assembly, the outer and inner extension members extending in the direction of the tracks and being coupled together for extension and retraction movement in the direction of their extension.

15. The track system of claim 14 comprising a latch coupled to at least one extension assembly to release it for extension or retraction movement.

16. The track system of claim 15 in which the latch is configured automatically to engage and lock the said at least one extension assembly against relative extension and retraction.

17. The track system of claim 14 in which each extension assembly provides a motion resistance less than the motion resistance provided by the associated roller assembly and track.

18. A track system for supporting a vehicle door for extended rearward movement relative to an opening in the side of the vehicle, the door having an upper portion, a lower portion, a forward portion and a rear portion, the vehicle having an upper track extending along and above the opening and a lower track extending along and below the opening, the track system comprising:

(a) upper and lower roller assemblies movable respectively along the upper and lower tracks, and (b) upper and lower extension assemblies configured respectively to couple the upper and lower roller assemblies to the door, each of the extension assemblies having an outer extension member to be coupled to the door and an inner extension member to be coupled to its respective roller assembly, the outer and inner extension members extending in the direction of the tracks and being coupled together for extension and retraction movement in the direction of their extension, the lower track configured to support at least a portion of the weight of the door.

19. The track system of claim 18 comprising a latch configured to lock at least one of the upper and lower extension assemblies against relative extension and retraction.

20. The track system of claim 18 in which each extension assembly provides less resistance to movement than its associated roller assembly track.

\* \* \* \* \*